(12) United States Patent
Bick et al.

(10) Patent No.: US 7,606,139 B2
(45) Date of Patent: Oct. 20, 2009

(54) PREAMBLE DETECTION USING FREQUENCY BASED CORRELATION

(75) Inventors: Eyal Bick, Ra'anana (IL); Uri Perlmutter, Holon (IL); Yuval Lomnitz, Herzelia (IL)

(73) Assignee: Intel Corporation, Santa Clara, CA (US)

( * ) Notice: Subject to any disclaimer, the term of this patent is extended or adjusted under 35 U.S.C. 154(b) by 549 days.

(21) Appl. No.: 11/635,886

(22) Filed: Dec. 8, 2006

(65) Prior Publication Data

US 2008/0137527 A1      Jun. 12, 2008

(51) Int. Cl.
*H04J 11/00* (2006.01)

(52) U.S. Cl. .................. 370/210; 370/203; 370/208; 370/329; 375/316

(58) Field of Classification Search .................. 370/210, 370/203, 208, 329; 375/316
See application file for complete search history.

(56) References Cited

U.S. PATENT DOCUMENTS

| | | | |
|---|---|---|---|
| 7,561,628 B2 * | 7/2009 | Sung et al. | 375/260 |
| 2005/0152317 A1 * | 7/2005 | Awater et al. | 370/338 |
| 2006/0078040 A1 * | 4/2006 | Sung et al. | 375/140 |
| 2008/0107200 A1 * | 5/2008 | Zhu et al. | 375/260 |

* cited by examiner

*Primary Examiner*—Ricky Ngo
*Assistant Examiner*—Luat Phung
(74) *Attorney, Agent, or Firm*—Lee & Hayes, PLLC

(57) ABSTRACT

A method for detecting a preamble location in a multiple preamble OFDM (Orthogonal Frequency Division Multiplexing) system is disclosed. An OFDM signal is generated with a plurality of frames, and each of the frames includes symbols and a predetermined preamble symbol. A maximum FDDC (Frequency Domain Differential Correlator) value is computed for each of the symbols in some of the frames. The preamble location in a frame is determined by summing the maximum FDDC value for each symbol at a same frame location in consecutive frames of the OFDM signal.

14 Claims, 4 Drawing Sheets

US 7,606,139 B2

PREAMBLE DETECTION USING FREQUENCY BASED CORRELATION

BACKGROUND

Typically, an OFDM (Orthogonal Frequency Division Multiplexing) modulation technology, gives wireless networking a physical (PHY) layer. OFDM modulation technology is typically implemented in embedded OFDM chipsets that could include radio transceivers, Fast Fourier Transform (FFT) processors, system input/output (I/O), serial to parallel and back again translators In practice, the OFDM chipset bundles data into frames which are transmitted over narrowband carriers in parallel at different frequencies. High bandwidth is achieved by using these "parallel subchannels (aka sub-carriers) that are as closely spaced as possible in frequency without overlapping/interfering. By being orthogonal, they have no overlap, and thus do not interfere at all with each other. Orthogonal means that they are perpendicular, but in a mathematical, rather than a spatial, sense.

OFDM, though, has to contend with other problems besides multipath distortion. Two of the most important problems are frequency offset and phase noise. Both can happen when the receiver's voltage-controlled oscillator (VCO) is not oscillating at exactly the same carrier frequency as the transmitter's VCO. When the problem is permanent, its called frequency offset; that could result in more errors because the no-longer orthogonal sub-carriers can interfere with each other.

One solution is to include a training sequence at the beginning of every packet using subcarriers. These subcarriers are modulated with the known training data using binary phase-shift keying (BPSK) to produce "pilot tones." These tones let both the transmitter and receiver determine the frequency offset and phase noise jitter between the transmitter and the receiver. Once known, adjusting the VCO's frequency and adaptively correcting for the current offset will correct the frequency offset.

The Wimax standard (IEEE Std. 802.16-2004) released Oct. 1, 2004 uses frames that have a preamble that may have a constant frequency offset. In Wimax an OFDM symbol at the start of a frame is part of a set of several pre-defined preamble symbols. When the receiver initially powers on, it may not know which preamble is transmitted, and what the frequency offset is and time offset of the OFDM signal. Further the Wimax system may simultaneously receive multiple preamble symbols from different base stations the may use the same frequency resulting in a signal interference and negative signal to noise ratio (SNR) at the frame edge.

DESCRIPTION OF THE FIGURES

Additional objects and features as defined by the claims will be more readily apparent from the following detailed description and appended claims when taken in conjunction with the drawings, in which:

DESCRIPTION

An OFDM subscriber receiver must handle three uncertainties on initial OFDM frame reception. These uncertainties may include a preamble index (that identifies which preamble is being used), a signal frequency and a signal time offset in a negative SNR environment. In order to demodulate and decode the OFDM data symbols located in a frame, the receiver must shift the sub-carriers to their correct frequencies and commence a demodulation and the decoding process for each symbol. The receiver described herein is assumed to be a digital receiver that can detect a frame pre-amble. Upon detection, the digital receive can provide the results of the detection available to digital synchronization circuitry to enable decoding of the received signal.

While the present claimed subject matter described herein is based on specific specification, characteristics and techniques based on the 802.16 standard, such specifications, characteristics and techniques are used for purposes of illustrating and describing the present invention. While description and drawings herein represent a preferred embodiment of the present invention, it will be understood that various additions, modifications and substitutions may be made to the specifications, characteristics and techniques of the 802.16 standard without departing from the spirit and scope of the present invention as defined in the accompanying claims. In particular, it will be clear to those skilled in the art that the present invention may be embodied in other specific forms, preamble formats and structures, data formats and structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description. Furthermore, it should be noted that the order in which the process is performed may vary without substantially altering the outcome of the process.

Figure 1:
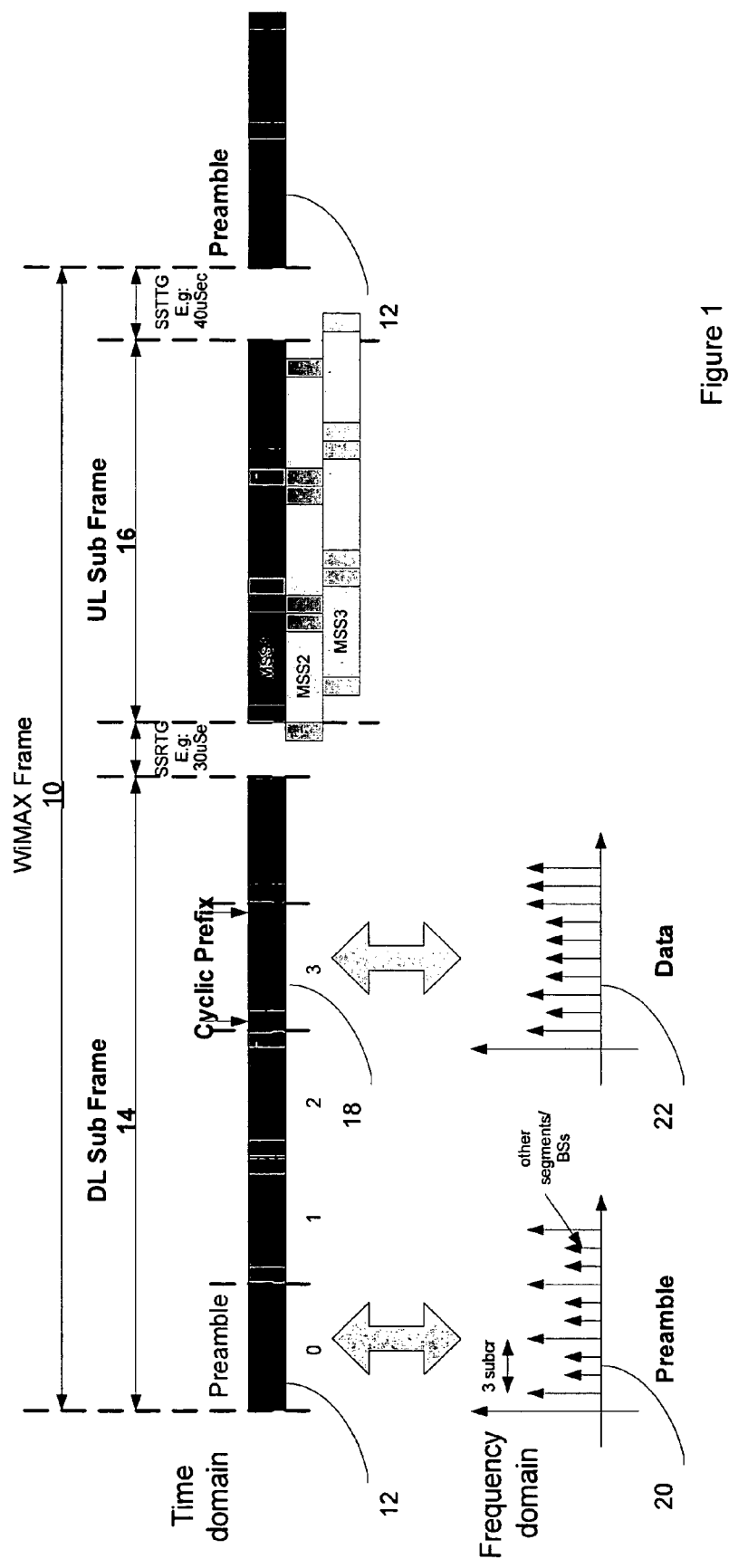
FIG. 1 is a WiMax OFDM frame.

Returning now to FIG. 1, an OFDM WiMax data frame 10 comprises a DL Sub frame 14 that includes a predetermined preamble 12 and a UL Sub Frame 16. The WiMax frame has a total duration of 5 mSec, with each symbol having a period duration of about 100 microseconds. The duration between the DL subframe 14 and UL Subframe 16 is fixed to about 30 uSec, while the duration between the UL subframe 16 and DL Subframe 14 is fixed to about 40 uSec.

The preamble 12 comprises a symbol that has a predetermined duration and number of bits which are defined by the 802.16 standard, which is hereby incorporated by reference. Preamble 12 is shown having four bits just for illustrative purpose. The actual number of bits of the preamble may be a higher number such as the size defined in the 802.16 specification. Preamble 12 is illustrated in the frequency domain by 20. Each symbol in WiMax frame 10 also includes a cyclic prefix extension 18 that is positioned in time at the beginning and end of the symbol. Cyclic prefix extension 18 may be included in frame 10 to preserve the orthogonally of the sub-carriers over the FFT processing interval in un-equalized channels. Examples of such channels include the Wimax multi-path channels. Data of one of the symbols is represented in the frequency domain by 22 having multiple bits with random amplitude. The UL Sub Frame 16 likewise comprises multiple symbols each having a cyclic prefix extension.

Figure 2:
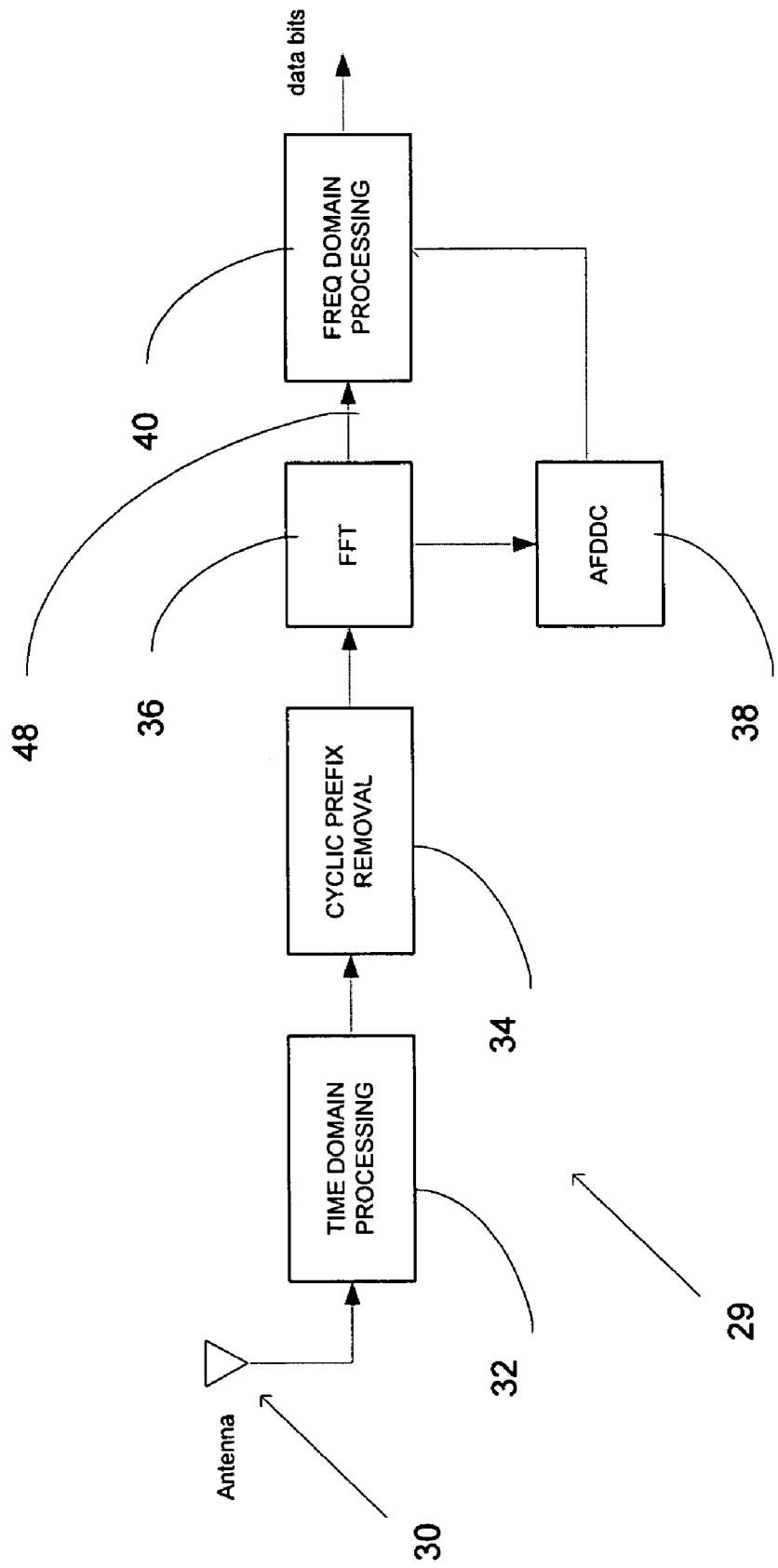
FIG. 2 is a simplified block diagram of a circuit for detecting the preamble using a method shown in FIG. 3.

Referring to FIG. 2, circuit 29 may be used to identify the preamble. Circuit 29 comprises an antenna 30 and is coupled with translation circuit 32. Circuit 32 is coupled with cyclic prefix removal circuit 34 and has an output connected to Fast Fourier transform circuitry 36. Fast Fourier transform circuitry 36 provides an output signal that is fed to AFDCC (Averaged Frequency Domain Differential Correlator) circuit 38 and frequency domain processing circuit 40.

The OFDM signal may be in the form of a data frame 10. The OFDM signal may be received by antenna 30 and fed to time domain translation circuit 32. Translation circuit 32 filters the signal; performs rate conversion and other time domain processing of the signal. The resultant output of translation circuit 32 is fed to cyclic prefix removal circuit 34. Removal circuit 34 removes the cyclic prefix 18 from the resultant output. The output of removal circuit 34 is fed to Fast Fourier Transform circuit 36 to generate a Discrete FFT signal. The output 48 of circuit 36 may be fed to AFDCC circuit 38 and to Frequency Domain processing circuit 40. AFDCC circuit 38 identifies the location of the preamble, details of which are described in FIGS. 3 and 4, and feeds a signal indicating the location to frame timing control block (Not Shown).

Frame timing control block receives a number corresponding to the time of the preamble location within a data frame as determined by the AFDDC circuit 38. Frame timing control block determines a frame time and feeds the resulting location and frame time to time domain translation circuit 32. Circuit 40 may identify, derive and output the data bits embedded in the frame. These data bits may then be stored in a memory of an electronic circuit or a computer for further processing. Circuits 36-40 may include a one or more processors and memory (not shown) or other electronic hardware, or may be coupled with a processor for performing the operations described in FIGS. 3 and 4. The processor may execute instructions stored in any type of computer readable memory, examples may include, but are not limited to, flash memory, hard disk drives, optical disks, semiconductor, RAM or ROM memory.

Figure 4:
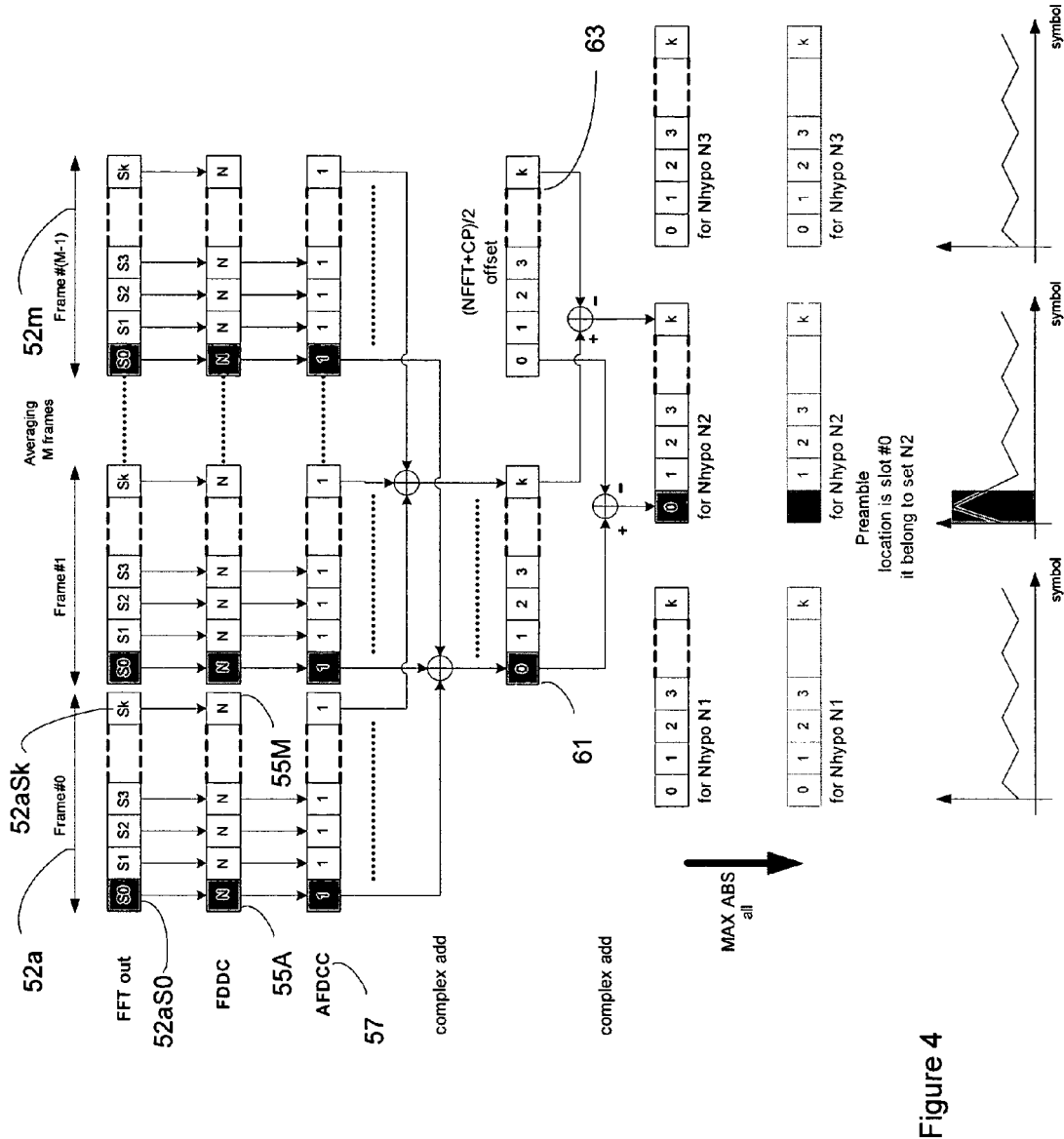
FIG. 4 is a diagram of using the frequency domain differential correlator and averaged frequency domain differential correlator algorithm to detect the pre-amble.

Referring to FIG. 4, the output 48 of the FFT circuit 36 is received in block 50. Output 48 is shown in FIG. 4 as a frame 0 through frame M−1 (and labeled as FFT Out), where M is the number of frames being sampled to identify the preamble. Frame 0 through M−1 is designated in FIG. 4 as 52a-52m. Each of these frames has a symbol 0 through k, designated in FIG. 4 as 52aS0-52aSk.

Figure 3:
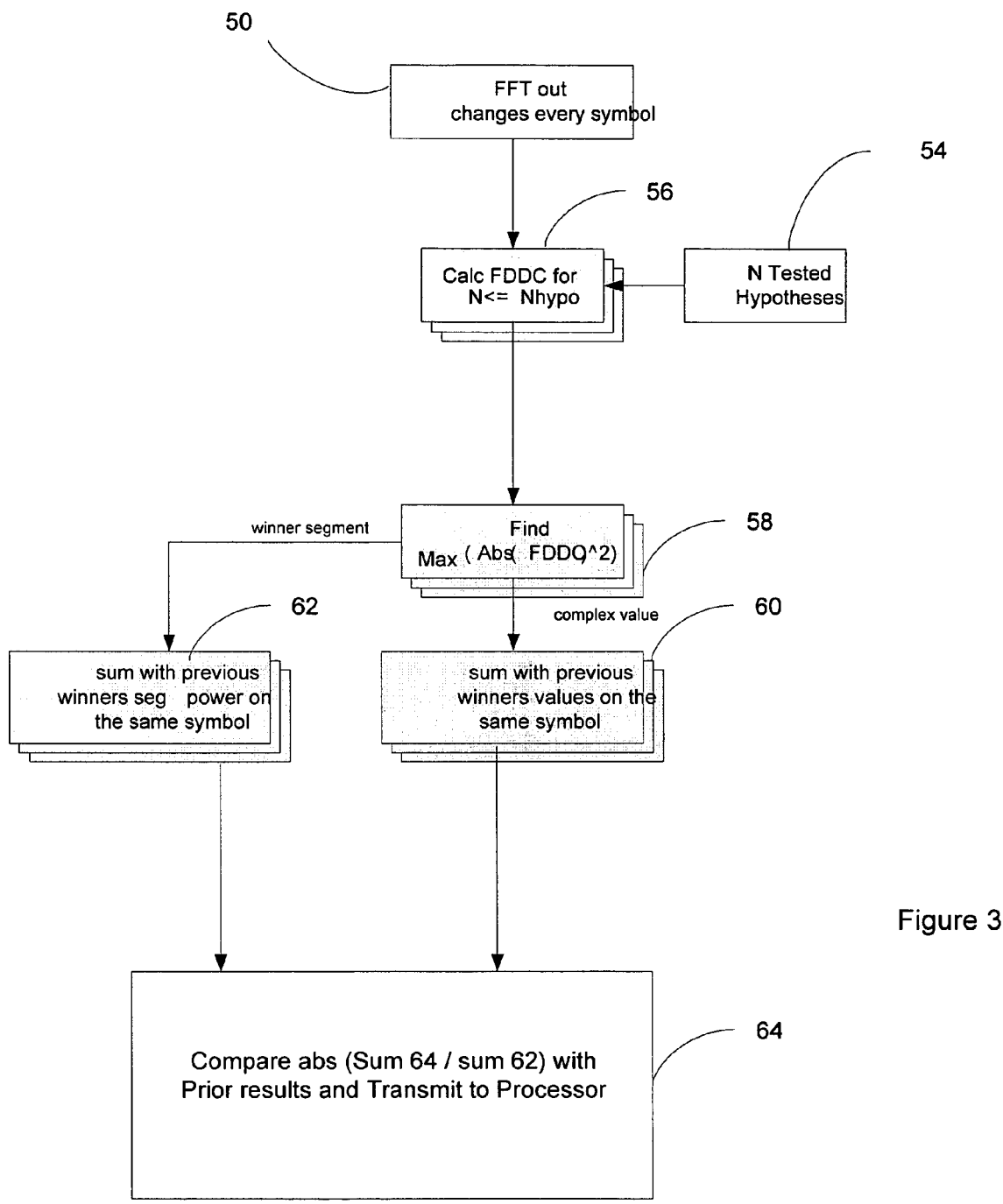
FIG. 3 is a flow diagram of the method for detecting the pre-amble.

In block 54 of FIG. 3, each of the unknown variables for a hypothesis are generated for the following Equation 1:

$$FDDC(x, y, z) = \sum_{k=0}^{Plen-1} FftOut(z, Y_0 + y + StepSize \times k) \times$$
$$conj\{FftOut(z, Y_0 + y + StepSize \times (k+1))\} \times DP(x, k)$$

In this equation the FDDC value (Also referred to as the Frequency Domain Differential Correlator) (FDDC(x, y, z)) is generated for preamble x, with frequency offset y, at symbol z within the frame. Plen is a length of the predetermined preamble symbol in bits, StepSize is a difference in FFT bins between consecutive bits of the preamble symbol, $Y_0$ is a frequency offset of the FFT bin where the first symbol bit is transmitted, and the output of function DP(x, k) where, k is bit k of preamble x in differential form, is selected from a group consisting of −1 or +1.

In block 56, each of the hypothesis values determined in block 54 are fed into Equation 1 to calculate multiple values for each of the symbols (Such calculation is referred to herein as NHypothesis, where N is the number of different outcomes from a change in the variables calculated using Equation 1).

For example, where N=1, a unique value for x (the preamble index) and y (the frequency offset) is assigned by placing numbers instead of variables into Equation 1. For an exemplary preamble number 0, the first 5 differential bits may be assigned such that DP(x=0,k=0:4)=+1,+1,−1,+1,−1. When x is known, DP(x, k) would represent the known preamble sequence. The results using Equation 1 generated for each symbol within a frame, and are referred to as a Frequency Domain Differential Correlator (FDDC), 55A-55M (FIG. 4). The resultant FDDC 55A-55M is fed to block 58.

In block 58, a maximum FDDC for each of the NHypothesis for each symbol in a frame is determined by using the formula for the absolute value of FDDC, which is defined as the squareroot (real^2+imag^2) component of the FDDC. The average highest FDDC may be referred herein to as the AFDDC (57 in FIG. 4), or Averaged Frequency. Domain Differential Correlator. The AFDDC may be determined using the following Equation 2:

$$AFDDC(z) = \sum_{k=0}^{Nframes-1} \max_{\substack{x \in X \\ y \in Y}} \{FDDC(x, y, z, k)\}$$

Where:

k is the Frame number x is a specific preamble sequence, X is the range of possible preambles, y is a specific frequency offset for the preamble symbol, and Y is a; range of possible frequency offsets (also referred to as FFT bins).

In block 60, the complex component for AFDDC having the maximum value for one symbol in the frame is summed with the FDDC complex component for each symbol at a same frame location in consecutive frames of the OFDM signal. (Offset 63 shown in FIG. 4)

Likewise in block 62, the segment power of the winning hypothesis is summed to enable power normalization in later stage. (Value 61 for N Hypo in FIG. 4).

There are 3 possible segment power values: 0, 1, 2.

$$SEG\_PWR(S) = \sum_{k}^{(NFFT/3)} |FFT\_OUT(3k + S)|^2; S = 0, 1, 2$$

In block 64, the absolute value of the combination of (the sum of the maximum value for each of the NHypotheticals from block 60 divided by the sum of the win segment power from 62). The maximum of such absolute value would be the preamble location. For example, in FIG. 4, such a location is indicated by slot #0 of set N2.

One advantage of using the maximum value in consecutive frames to determine the Preamble location is that the number of values that has to be stored in memory is reduced by several factors. Such maximum value corresponds to the span of z, which is the number of symbols in a frame.

By using only the highest FDDC value per symbol, at the end of the process one may not be able to determine the preamble index of frequency offset but rather the location or symbol number of the preamble. However, once the preamble location is known, other parameters (e.g. frequency offset and preamble index) can easily be determined.

The invention claimed is:

1. A method comprising:
   storing, in a memory, instructions for performing the method;
   executing the instructions on a processor;
   according to the instructions being executed;
      receiving a multiple preamble Orthogonal Frequency Division Multiplexing (OFDM) signal comprising a plurality of frames, the frames comprising symbols and a preamble with a plurality of predetermined preamble symbols;
      computing a maximum Frequency Domain Differential Correlator (FDDC) value for each of the symbols in the frames; and
      determining a location of the preamble in one of the plurality of frames by summing the maximum FDDC value for each symbol at a same frame location in consecutive frames of the OFDM signal, wherein said determining the location of the preamble further comprises comparing the summed maximum FDDC values for each symbol at a same frame location in consecutive frames with a summed maximum FDDC values for each symbol at an adjacent frame location in consecutive frames, wherein said determining the preamble location further comprises identifying the preamble location of the symbols at the same frame location in consecutive frames as having a summed maximum FDDC value lamer than the summed maximum FDDC value for each symbol in the adjacent frame locations in consecutive frames.

2. The method as recited in claim 1, wherein the FDDC value (FDDC(x, y, z)) for a preamble x having a frequency offset y at a symbol location z within one of the frames is computed from $$FDDC(x, y, z) = \sum_{k=0}^{Plen-1} FftOut(z, Y_0 + y + StepSize \times k) \times$$
$$conj\{FftOut(z, Y_0 + y + StepSize \times (k+1))\} \times DP(x, k),$$

and wherein Plen is a length of the predetermined preamble symbol in bits, StepSize is a difference in Fast Fourier Transform (FFT) bins between consecutive bits of the preamble symbol, $Y_0$ is a frequency offset of an FFT bin where a first bit of a symbol is transmitted, and function DP(x, k) includes a bit k of a preamble sequence x in differential form having an output selected from a group consisting of −1 or +1.

3. The method as recited in claim 1 further comprising synchronizing a receipt of data contained within the OFDM signal using the location of the detected preamble.

4. The method of claim 1, wherein said determining the preamble location further comprises calculating an absolute value of (a summed maximum imaginary component of the FDDC values for each symbol at a same frame location in consecutive frames divided by a summed maximum real component of the FDDC values for each symbol at same frame location in consecutive frames) and comparing the absolute value with a second absolute value of (a summed maximum imaginary component of the FDDC values for each symbol at another frame location in consecutive frames divided by a summed maximum real component of the FDDC values for each symbol at the adjacent frame location in consecutive frames).

5. An apparatus comprising:
   a first circuit to compute a maximum Frequency Domain Differential Correlator (FDDC) value for each of a plurality symbols disposed within frames of a multiple preamble Orthogonal Frequency Division Multiplexing (OFDM) signal, each of the frames including a predetermined preamble symbol; and
   a second circuit to determine a preamble time location in the frames by summing the maximum FDDC value for each symbol at a same frame location in consecutive frames of the OFDM signal, wherein the second circuit to determine the preamble time location further comprises:
      a comparator circuit to compare the summed maximum FDDC values for each symbol at a same frame location in consecutive frames with a summed maximum FDDC values for each symbol at an adjacent frame location in consecutive frames;
      an identification circuit to identify the preamble time location of the symbols at the same frame location in consecutive frames as having a summed maximum FDDC value lamer than the summed maximum FDDC value for each symbol in the adjacent frame locations in consecutive frames.

6. The apparatus as recited in claim 5, wherein the first circuit is to compute the FDDC value (FDDC(x, y, z)) for a symbol x having a frequency offset y at a symbol location z within the frame from $$FDDC(x, y, z) = \sum_{k=0}^{Plen-1} FftOut(z, Y_0 + y + StepSize \times k) \times$$
$$conj\{FftOut(z, Y_0 + y + StepSize \times (k+1))\} \times DP(x, k),$$

where Plen is a length of the predetermined preamble symbol in bits, StepSize is a difference in Fast Fourier Transform (FFT) bins between consecutive bits of the preamble symbol, $Y_0$ is a frequency offset of an FFT bin where a first bit of a symbol is transmitted, and function DP(x, k) includes a bit k of preamble symbol x in differential form having an output selected from a group consisting of −1 or +1.

7. The apparatus as recited in claim 5 further comprising a synchronization circuit to synchronize the receipt of data derived from the OFDM signal using the preamble time location.

8. The apparatus of claim 5, wherein the circuit to determine the preamble time location further comprises a circuit to calculate a first absolute value of (a summed maximum imaginary component of the FDDC values for each symbol at a same frame location in consecutive frames divided by a summed maximum real component of the FDDC values for each symbol at same frame location in consecutive frames) and to compare the first absolute value with a second absolute value of (a summed maximum imaginary component of the FDDC values for each symbol at another frame location in consecutive frames divided by a summed maximum real component of the FDDC values for each symbol at the another frame location in consecutive frames).

9. A system comprising:
   an antenna to receive a multiple preamble Orthogonal Frequency Division Multiplexing (OFDM) signal including a plurality of frames, said frames including symbols and a predetermined preamble symbol;

a receiver coupled with the antenna to receive the OFDM signal;

a translation circuit to filter the OFDM signal;

a Fast Fourier Transform (FFT) circuit coupled with the translation circuit to generate a discrete FFT signal from the OFDM signal;

a first circuit coupled with the FFT circuit to compute a maximum Frequency Domain Differential Correlator (FDDC) value for each of the symbols in some of the frames; and a second circuit to determine a time location of the predetermined preamble symbol in a frame by summing the maximum FDDC value for each symbol at a same frame location in consecutive frames of the OFDM signal, wherein the second circuit that determines the time location of the preamble further comprises:

a comparator circuit to compare the summed maximum FDDC values for each symbol at a same frame location in consecutive frames with a summed maximum FDDC values for each symbol at an adjacent frame location in consecutive frames; and an identification circuit to identify the preamble time location of the symbols at the same frame location in consecutive frames as having a summed maximum FDDC value larger than the summed maximum FDDC value for each symbol in the adjacent frame locations in consecutive frames.

10. The system as recited in claim 9, wherein the first circuit is operative to compute the FDDC value (FDDC(x, y, z)) for a symbol x having a frequency offset y at a symbol location z within the frame from $$FDDC(x, y, z) = \sum_{k=0}^{Plen-1} FftOut(z, Y_0 + y + StepSize \times k) \times$$

$$conj\{FftOut(z, Y_0 + y + StepSize \times (k+1))\} \times DP(x, k),$$

where Plen is a length of the predetermined preamble symbol in bits, StepSize is a difference in FFT bins between consecutive bits of the preamble symbol, $Y_0$ is a frequency offset of one of the FFT bins where a first symbol bit is transmitted, and function DP(x, k) includes bit k of preamble symbol x in differential form having an output selected from a group consisting of −1 or +1.

11. The system as recited in claim 9 further comprising a synchronization circuit to synchronize the receipt of a data derived from the OFDM signal using the time location of the detected preamble.

12. The system of claim 9, wherein the circuit to determine the preamble location further comprises a circuit to calculate a first absolute value of (a summed maximum imaginary component of the FDDC values for each symbol at a same frame location in consecutive frames divided by a summed maximum real component of the FDDC values for each symbol at same frame location in consecutive frames) and comparing the first absolute value with a second absolute value of (a summed maximum imaginary component of the FDDC values for each symbol at another frame location in consecutive frames divided by a summed maximum real component of the FDDC values for each symbol at the another frame location in consecutive frames).

13. A computer readable medium comprising:
computer executable instructions which, when executed by a processor, causes the processor to:
i. receive a plurality of frames derived from an Orthogonal Frequency Division Multiplexing (OFDM) signal, the frames comprising symbols and a preamble including a predetermined preamble symbol;
ii. compute a maximum Frequency Domain Differential Correlator (FDDC) value for each of the symbols in the frames, wherein the FDDC value (FDDC(x, y, z)) for a preamble x having a frequency offset y at a symbol location z within one of the frames is computed from $$FDDC(x, y, z) = \sum_{k=0}^{Plen-1} FftOut(z, Y_0 + y + StepSize \times k) \times$$

$$conj\{FftOut(z, Y_0 + y + StepSize \times (k+1))\} \times DP(x, k)$$

wherein Plen is a length of the predetermined preamble symbol in bits. StepSize is a difference in Fast Fourier Transform (FFT) bins between consecutive bits of the preamble symbol, $Y_0$ is a frequency offset of an FFT bin where a first bit of a symbol is transmitted, and function DP(x, k) includes a bit k of a preamble sequence x in differential form having an output selected from a group consisting of −1 or +1; and
iii. determine a location of the preamble in one of the plurality of frames by summing the maximum FDDC value for each symbol at a same frame location in consecutive frames of the OFDM signal.

14. The computer readable medium of claim 13, wherein said determination of the location of the preamble further comprises comparing the summed maximum FDDC values for each symbol at a same frame location in consecutive frames with a summed maximum FDDC values for each symbol at an adjacent frame location in consecutive frames.

* * * * *